US010452522B1

(12) United States Patent
Arguelles et al.

(10) Patent No.: US 10,452,522 B1
(45) Date of Patent: Oct. 22, 2019

(54) SYNTHETIC DATA GENERATION FROM A SERVICE DESCRIPTION LANGUAGE MODEL

(71) Applicant: Amazon Technologies, Inc., Seattle, WA (US)

(72) Inventors: Carlos Alejandro Arguelles, Shoreline, WA (US); Xiaozheng Chen, Kirkland, WA (US); Mahmoud Mahmoud, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 14/745,212

(22) Filed: Jun. 19, 2015

(51) Int. Cl.
*G06F 11/36* (2006.01)

(52) U.S. Cl.
CPC ...... *G06F 11/3684* (2013.01); *G06F 11/3688* (2013.01)

(58) Field of Classification Search
CPC .................. G06F 11/3684; G06F 11/3688
See application file for complete search history.

(56) References Cited

U.S. PATENT DOCUMENTS

| 8,145,726 | B1* | 3/2012 | Roche | G06F 11/3688 709/219 |
| 2004/0199818 | A1* | 10/2004 | Boilen | G06F 11/36 714/25 |
| 2005/0193291 | A1* | 9/2005 | Subramanian | G06F 11/3664 714/710 |
| 2009/0006897 | A1* | 1/2009 | Sarsfield | G06F 11/3684 714/38.14 |
| 2009/0319832 | A1* | 12/2009 | Zhang | G06F 11/3684 714/38.1 |
| 2010/0095276 | A1* | 4/2010 | Ottavi | G06F 11/3672 717/125 |
| 2011/0208469 | A1* | 8/2011 | Sheye | G06F 11/3668 702/123 |
| 2012/0053894 | A1* | 3/2012 | Macik | G06F 11/3414 702/176 |
| 2013/0145250 | A1* | 6/2013 | Neumueller | G06F 11/3696 715/234 |
| 2013/0219217 | A1* | 8/2013 | Seren | G06F 11/3664 714/27 |
| 2014/0047342 | A1* | 2/2014 | Breternitz | G06F 9/5061 715/735 |

(Continued)

OTHER PUBLICATIONS

Wikipedia ® "Web Services Description Language", retrieved on Mar. 6, 2019, <https://en.wikipedia.org/wiki/Web_Services_Description_Language>, 6 pages.

*Primary Examiner* — Yolanda L Wilson
(74) *Attorney, Agent, or Firm* — Patterson + Sheridan, LLP (57) ABSTRACT

Embodiments presented herein provide techniques for dynamically generating synthetic test data used to test a web service. In one embodiment, a service description language document defining a web service may include a test interface definition. The test interface definition specifies rules for generating the synthetic data to use when testing API interfaces exposed by the web service, e.g., to generate synthetic data needed carry out load and performance testing. Including rules for generating test data in the service description language document provides a centralized and authoritative source for both building and testing the web service.

20 Claims, 7 Drawing Sheets

(56) References Cited

U.S. PATENT DOCUMENTS

| | | | |
|---|---|---|---|
| 2014/0123114 A1* | 5/2014 | Navalur | G06F 11/3688 717/127 |
| 2014/0289699 A1* | 9/2014 | Paterson | G06F 11/3664 717/106 |

* cited by examiner

SYNTHETIC DATA GENERATION FROM A SERVICE DESCRIPTION LANGUAGE MODEL

BACKGROUND

Computing applications and web services are frequently made available over computer networks such as the Internet. Web services are distributed applications that can be described, published, located, or invoked over computing networks. Generally, a web service provides an application made available over the internet which communicates with endpoints and other services using standardized messaging protocols. For example, a client invokes a web service by sending a message to a web service endpoint and waiting for a response.

Both the request and the response may be formatted using machine readable markup languages (e.g., XML). A variety of web service frameworks have been developed which allow developers to define a web service using a service description language, e.g., Web Services Description Language (WSDL). Service owners use the service description language to compose a document describing an entire web service. Service description languages, such as WSDL, define a machine-readable format for describing a network location for a web service, protocols supported by the web service, interfaces exposed by the web service, parameters passed to API calls defined by the web service, and data structures returned by API calls defined by the web service.

Service owners typically perform a variety of tests to confirm a web service operates correctly. In addition, service owners often perform load and performance testing to understand how well a web service performs at an expected production load and to evaluate how well a service can respond to spikes in demand. Currently, load and performance tests developed to test a web service include logic reflecting how the service is called, parameters passed to the service, and data structures returned by the tests, etc. However, this duplicates information present in the service description language document in the tests. Duplicating this information from the service description language document increases the time required to develop load and performance tests. As the time to test a service is frequently limited, this additional development time can result in less-than-desired testing time and lower quality software.

Further, duplicating web service description information in the tests increases maintenance complexity. For example, since the logic describing a web service is present in both the service description language document and in the test code, the logic in the tests needs to be updated each time the service is modified or updated. As a result, changes to the service and the test code often need to be coordinated. For example, changes made to a production service that are incompatible with the test code can result in a broken build or result in tests compiling but then failing, thus blocking (or at least delaying) a new (or updated) service deployment. This further increases development time needed to manage test code and reduces the time for actual testing.

BRIEF DESCRIPTION OF DRAWINGS

Various embodiments in accordance with the present disclosure will be described with reference to the drawings, in which.

DETAILED DESCRIPTION

Embodiments presented herein provide techniques for dynamically generating synthetic test data used to test a web service. In one embodiment, a service description language document defining a web service includes a test interface definition. The test interface definition specifies rules for generating synthetic data to use when testing API interfaces exposed by the web service, e.g., to carry out load and performance testing. Including rules for generating test data in the service description language document provides a centralized and authoritative source for both building and testing the web service.

A test platform may use the service description document to identify API calls which can be tested, as well as to identify what parameters should be included in invoking a given API call. Further, the test platform may parse the test interface definition to determine how to generate input values to use when invoking a given API call. That is, the test platform may generate synthetic test data needed to test API calls exposed by the web service according to the rules specified by the test interface definition. Doing so allows the test platform to dynamically generate load on demand, as opposed to the conventional approach of having product code and test code duplicate logic present in the service description language document in the tests.

In one embodiment, the test platform generates input values as needed each time the test platform invokes an API call of a web service under test. Because the service description language document encodes rules for generating input values for testing, the test engineer does not have to write code duplicating this information, removing the element of duplication and concurrent maintenance from the test code. Further, doing so significantly reduces the time needed to begin testing a web service and increases the amount of time available to actually test the service, as a test engineer may only need to specify what API calls to test and what load to apply. The test platform then generates the requested load with input values generated dynamically based on the test interface definition.

The service description language document may specify a variety of rules for generating synthetic data. For example, a rule could specify sample values to use when invoking an API call (or a list of sample values). The test tool can invoke this API call repeatedly with the same sample data, while measuring latency and throughput. Another option includes using "fuzzy" input data. For example, a fuzzy rule could specify to "fuzz" sample values according to a rule in the service description language document. Such a fuzzy rule could specify to add additional (or invalid) characters to a sample string input. At test time, the test platform can then "fuzz" a set of sample values on a per-call basis by modifying a sample value specified in the service description language document. Generating "fuzzy" input values may test how well the web service can handle tricky input cases.

Still another option includes rules specifying a blueprint or a template for generating synthetic data. For example, a service description language document could specify parameters passed to an API call along with metadata that defines constraints for each parameter. The test platform may use the metadata associated with an input parameter as a blueprint to generate synthetic data each time the API call is invoked during testing. As examples, the constraints could specify that a parameter should be a random string between seven and twelve characters, enumerate a list of parameter values that could be picked randomly or in a round-robin fashion, specify a distribution of values that should be followed in generating synthetic data, or specify a regular expression used to generate an input string. Of course, a variety of other blueprints or rules could also be used to specify how to generate synthetic data to test API calls exposed by a web service.

Advantageously, adding a test interface definition to a service description language document defining a web service allows a test platform to adaptively apply load to that web service without the need for a test engineer to write code for the test and without the need to change the test code when the product code changes. Further doing so accelerates testing in such a way that testing can happen nearly automatically, without an initial investment in development hours to develop test code.

Note, some embodiments are described herein using the Web Services Description language (WSDL) published by the W3C consortium as an example of a service description language. As known, WSDL specifies an XML format for describing network services as a set of endpoints operating on messages containing either document-oriented or procedure-oriented information. The operations and messages provided by a web service are described abstractly and then bound to a concrete network protocol and message format to define an endpoint. Of course, one of ordinary skill in the art will recognize that the techniques for synthetic data generation from a service description language model may be adapted for use with a variety of service description languages, web service frameworks, software architecture styles (e.g., Representational State Transfer (REST)), message protocols, markup languages, and data interchange formats (e.g., JSON).

Figure 1:
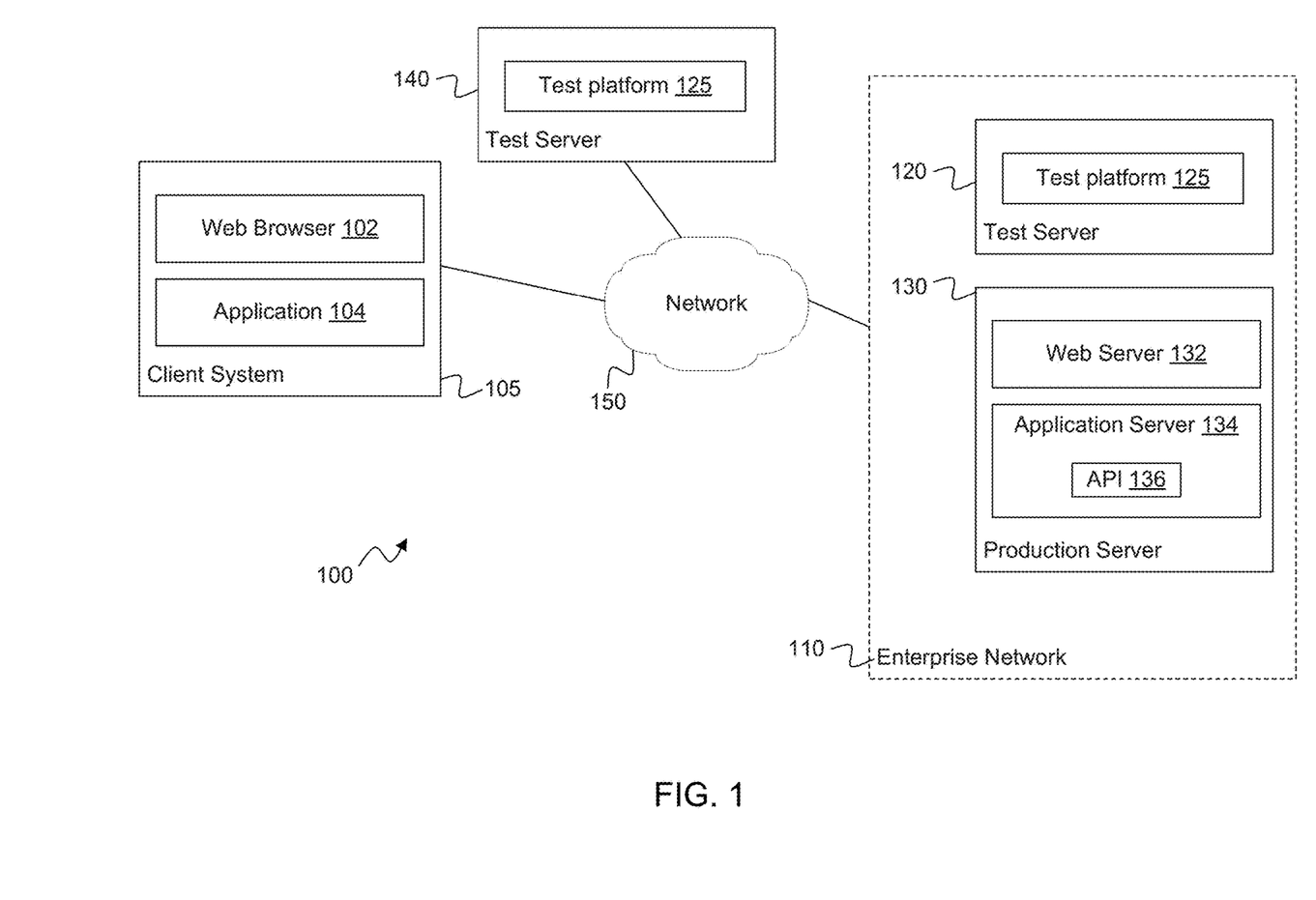
FIG. 1 illustrates an example of a computing environment, according to one embodiment.

FIG. 1 illustrates an example of a computing environment 100, according to one embodiment. As shown, the computing environment 100 includes a client system 130 and an enterprise network 155, both connected to a network 150 (e.g., the internet). The enterprise network 155 includes a test server 120 and a production server 130.

As shown, production server 130 includes a web server 132 and an application server 134. Production server 130 is included to be representative of a physical computing system as well as virtual machine instances deployed to a computing cloud. Web-server 132 may communicate with other applications on production server 130 (or on other computing systems), such as application server 134 to respond to requests from client system 105.

Client system 105 is included to be representative of a general purpose computing system such as desktop computer and laptop computer systems, as well as representative of mobile computing devices such as tablets and smart phones. As shown, the client system 105 includes a web-browser 102 and application 104, both of which may communicate with the web server 132 and the application server 134. For example, the web browser 102 may access a website hosted on the production server 130 via web server 132. In turn, the web server 132 may invoke API calls exposed by an API 136 on the application server 134 as part of building webpages returned to the browser 102.

Similarly, the application 104 may access web services hosted by the application server 134 as part of a distributed computing application. For example, a service provider may publish WSDL documents describing API 136 as a set web services available from the application server 134. In turn, developers may build software applications (e.g., application 104) which accesses web services provided by the APIs 136.

Typically, a service provider will test the functionality of an API 136 deployed to the application server 134. For example, prior to deployment, the service provider may perform a variety of testing processes (e.g., unit and integration testing) to ensure the web service functions correctly before being put into production. The service provider may also perform load and performance testing to ensure the service operates with acceptable latency at an expected production load or to identify how well a web service scales in response to spikes in demand.

Web services provided by API 136 may be subject to testing using the test platform 125 on test server 120. To do so, the test platform 125 may parse a service description language document describing the API 136 exposed on the application server, e.g., a WSDL document. The service description language document generally provides a machine readable description of API calls or functions available from the web service, what parameters are required for a given API call, and what messages or data structures are returned by a given API call. In one embodiment, the service description language document may also provide a machine readable description specifying rules for generating input values to test API calls or functions provided by API 136. Once the service description language document associated with API 136 is parsed, the test platform 125 may generate input values each time an API call of API 136 is invoked as part of testing. For example, to perform load and performance testing, the test platform 125 may invoke API calls of API 136 at a rate specified by a test engineer to apply an expected production load. During testing, the test platform 125 generates input values each time API 136 is invoked according to the rules for generating synthetic test data specified the by service description language document. In addition to the test server 120 deployed within the enterprise network 155, test server 140 (and test platform 125) may be deployed to any network accessible location. That is, test server 140 may access production server over an open network 150, e.g., from the internet. Doing so allows a service provider to access the production server 130 during testing in the same manner as web browser 102 and application 104.

Figure 2:
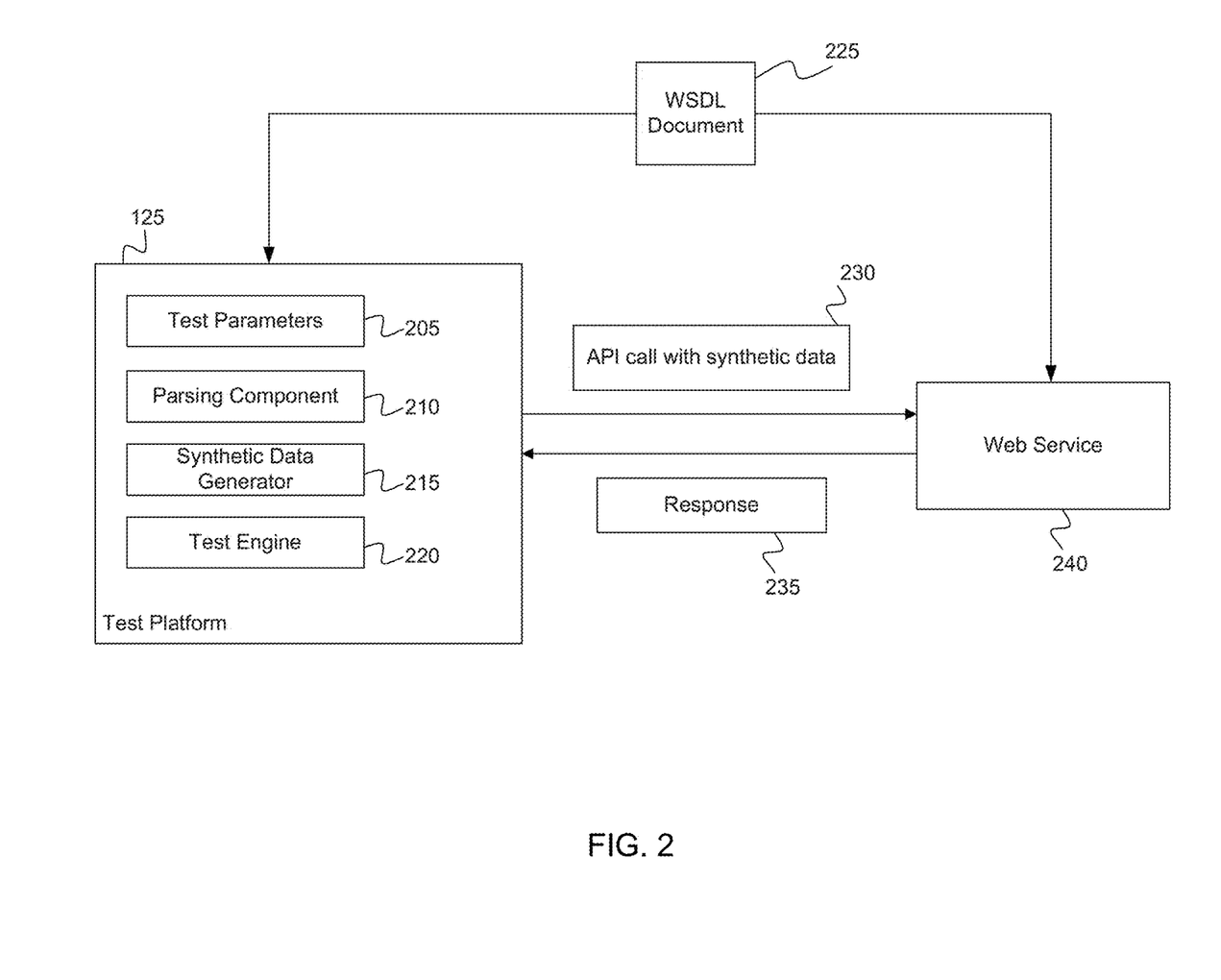
FIG. 2 further illustrates the test platform first shown in FIG. 1, according to one embodiment.

FIG. 2 further illustrates the test platform 125 first shown in FIG. 1, according to one embodiment. As shown, the test platform 125 includes test parameters 205, a parsing component 210, a synthetic data generator 215, and a test engine 220. In this example, the test platform 125 is used to test a web service 240 described by WSDL document 225. For example, the test platform 125 may be used to perform load and performance testing of the web service 240.

The test parameters 205 may specify what API calls of the web service 240 should be tested and what load should be directed to the API calls during testing, e.g., by specifying a desired number of transactions per second. During testing, the test platform 125 may invoke an API call exposed by the web service at a rate sufficient to apply a load to the web service specified in the test parameters 205. For example, the test parameters 205 might specify to invoke a single API call of the web service 240 to simulate an expected production load. Other examples include test parameters 205 specifying a load to direct to multiple, interacting API calls hosted by the web service 240 or specifying to increase the load directed to the web service 240 until the service becomes overwhelmed (i.e., a test to identify a maximum number of concurrent transactions before the service degrades beyond an acceptable threshold). In addition to load and performance testing, the test parameters 205 could also specify a scripted sequence of API calls to perform a coordinated task using multiple calls to web service 240, e.g. to test create, read, update, and delete API calls of web service 240 using synthetic data. Further, the test parameters could specify different loads to direct at different API calls during testing. In one embodiment, the test platform 125 is configured to generate and send web service requests to a service under test directly, i.e., the test platform may invoke the API calls directly. In other cases, the test platform 125 may manage a set of one or more client systems in order to direct a desired load to a web service.

The parsing component 210 may parse the WSDL document 225 to identify API calls exposed by the web service 240. For example, the WSDL document 225 may include a service interface definition describing an abstract type interface of the web service 240 and a protocol binding. The WSDL document 225 may also include a service implementation definition describing location information about the web service 240, e.g., a network address and port where messages composed according to the service interface definition should be directed. Once parsed, the test platform 125 may present a list of the identified API calls which may be subjected to testing along with the properties of the web service 240 specified in the WSDL document 225.

In one embodiment, the WSDL document 225 may also include a test interface definition specifying rules for generating synthetic data to use in testing the API calls specified in the service implementation definition. For example, the test interface definition may specify one or more sample values that may be used as an input to one or more the APIs call exposed by the web service 240. In other cases, the test interface definition may specify rules to modify or "fuzz" sample values for one or more of the API calls or blueprints used to algorithmically generate or select input values to use as input for one or more of the API calls. Of course, the test interface definition could specify a variety of other types of rules used to generate synthetic data for API calls of a web service under test.

The test engine 220 may invoke API calls of the web service 240 using input data generated by the synthetic data generator 215 based on the rules specified in the test interface definition. In one embodiment, the synthetic data generator 215 may generate input values as needed by the test engine 220 to invoke API calls exposed by the web service 240. For example, the synthetic data generator 215 may generate input values each time the test engine 220 invokes an API call during testing. The test engine 220 may also capture performance characteristics of the web service 240 during testing. For example, when invoking API call 230 using synthetic data, the test engine 220 may measure the latency in receiving a response 235. In addition, the test engine 220 could record whether any data included in the response 235 is correct, given the input values included with API calls 230. The test engine 220 could also record a variety of other metrics related to the performance of web service 240, e.g., transactions per second, throughput, a count of concurrent server connections, etc.

Figure 3:
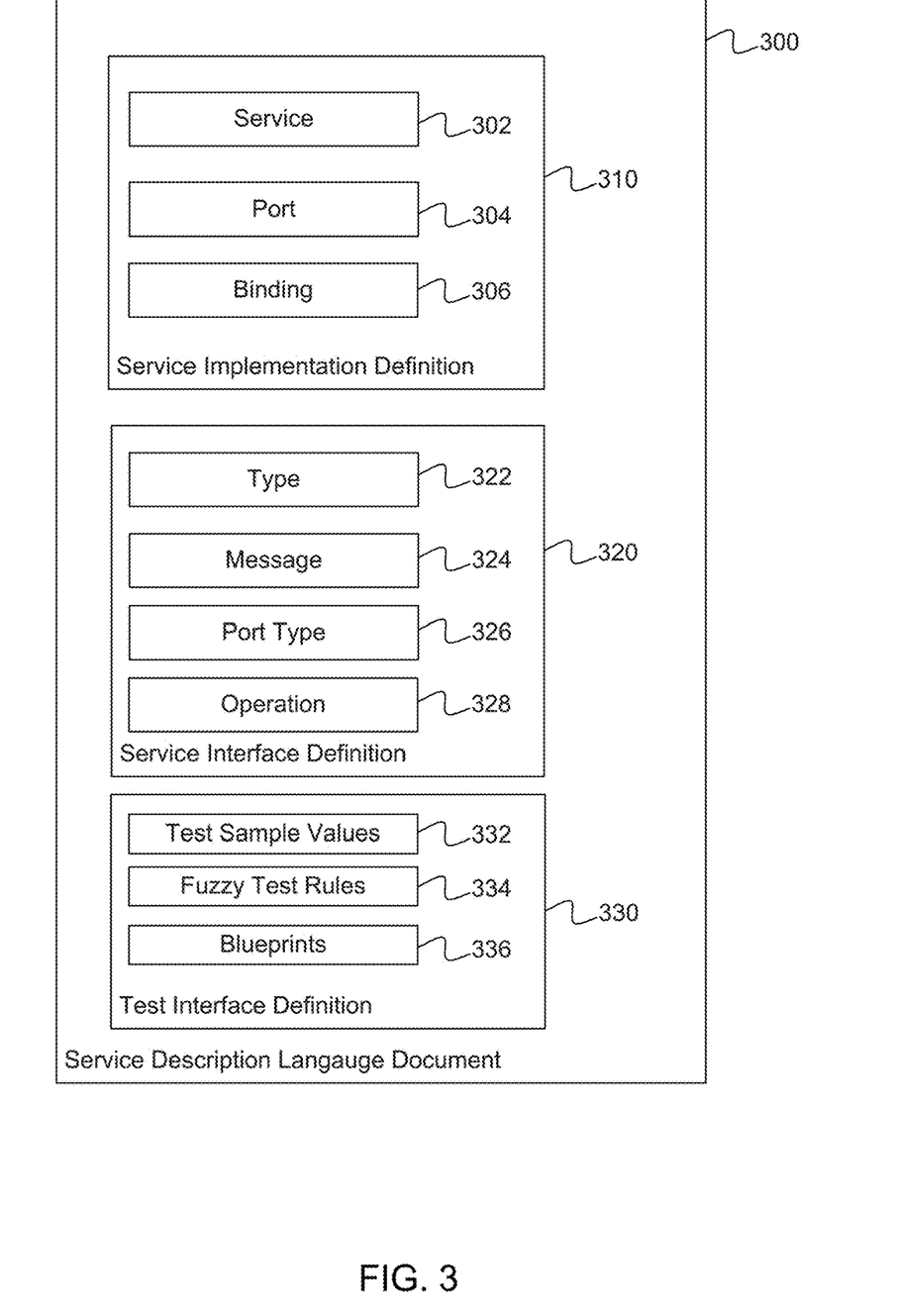
FIG. 3 illustrates an example of a web service description language document which includes a test interface definition, according to one embodiment.

FIG. 3 illustrates an example of a service description language document which includes a test interface definition, according to one embodiment. In this example, service a language description document 300 is modeled on components of the WSDL standard, extended to include additional machine readable elements specifying rules for generating synthetic data for testing services defined by the service description language document 300. However, as noted above, embodiments of the invention may be adapted for a variety of service description languages or web service frameworks.

As shown, service description language document 300 includes a service implementation definition 310, a service interface definition 320, and a test interface definition 330. The service implementation definition 310 includes a service element 302, a port element 304, and a binding element 306. Service element 304 typically includes port element 304, and port element 304 defines the location of a web service, e.g., a network address location or URL. The binding element 306 identifies what protocols the web service supports for operations defined by the service interface definition 320.

The service interface definition 320 includes a type element 322, a message element 324, and a port type element 326, and an operation element 328. The type element 322 specifies a set of data types defined for a given web service. The message element 324 describes the input values of a message passed to an operation defined by the web service, as well as any return values provided by the web service for a given operation. The port type element 326 describes what operations the web service supports. More specifically, the port type element 326 identifies a messaging mode and network protocol for each operation exposed by the web service but not the actual network address. The operation element 328 identifies a set of methods exposed by the web service, e.g., names of API calls exposed by the service along with any input and output parameters.

In addition to the service implementation definition 310 and service interface definition 320, service description language document 300 includes the test interface definition 330. In one embodiment, the test interface definition 330 extends a web service description document (e.g., a WSDL document) to include elements specifying how to generate synthetic data to use in invoking the operations defined by document 300, e.g., to generate synthetic data to use as input values when testing operations specified by the port type element 326 and operation element 328. In other cases the test interface definition 330 could be specified separately from the service description language document 300. That is, the test interface definition 330 could be stored independently as a machine readable document specifying rules for testing a corresponding web service.

Illustratively, the test interface definition 330 includes sample values 332, fuzzy rules 334 and blueprints 336. As noted, the test interface definition 330 provides a machine readable description (e.g., XML) of sample values and rules to use to test operations defined by the service description language document 300. The sample values 332 provide actual data values (or references to values) that can be used as input to web service operations being tested by the test platform. The fuzzy rules element 334 may specify rules for modifying or "fuzzing" sample values 332 or input values generated by the test platform based on one of the blueprints 336. For example, assume a sample value 332 specifies a constant input string passed to an operation defined by the service language description document 300. In such a case, a fuzzy rule could specify to add or remove characters, duplicate, invert or rearrange the string a random number of times, add invalid characters to the string, change the case of one or more characters, etc. Doing so allows the test platform to test a web service using a typical input value (e.g., an input text string) and also using modifications to that input value that may need special processing (e.g., strings that are of much larger than expected length, have incorrect case values, or have individual characters, etc.).

In addition to specifying an actual value (or list of such values) to use with a web service under test and specifying rules for "fuzzing" sample values, the test interface definition 330 may also include one or more blueprint elements 336 specifying rules or templates for generating input values for a parameter of a web service operation. For example, a blueprint could specify a constant value for an input parameter to a call or specify to use a round-robin selection over a set of constant values. Another example of a blueprint includes a rule specifying to use a random value from a set of constant values. For numeric input parameters, blueprints could specify to generate a random number within a specified set or range (e.g., an integer value between 10 and 100). In other cases, the system could generate a specified distribution of values, such as a 75/25 weighted selection between two strings.

Another example includes an input value generated using a counter incremented each time a given API call exposed by the web service is invoked. In such a case, the blueprint could specify an initial value for the counter, a step value to increment the counter each time the API call is invoked, and a maximum counter value. Still another example includes generating random strings. In such a case, the blueprint could specify which characters to pick from and a minimum or maximum length of the string. In still another case, a string could be generated according to a regular expression specified in a blueprint. For example, a regular expression could be used to generate a string representing a telephone number in the form (###) ###-####.

In one embodiment, the test interface definition 330 may use multiple rules to generate synthetic data to invoke a given API call. Continuing with the example of a regular expression used to generate a telephone number, a fuzzy rule could be used to modify the area code of an input value generated from the regular expression to be invalid or add an extra digit to the phone number generated by the blueprint. In such case, the test interface definition 330 may include elements specifying how to blend which rules are used to generate input values each time a web service under test is invoked by the test platform. Using the rules from the test interface definition, a test engineer could decide which rules or combinations of rules, should be used to test a given API call. For example, an API could be tested using a valid phone number generated from a regular expression blueprint ninety percent of the time and use a phone number generated from the regular expression blueprint, but modified by a fuzzy rule resulting in an invalid phone number being passed to the API Call the other ten percent of the time. Of course, in addition to the examples listed above, a variety of other blueprints, fuzzy rules, templates, or other rules and combinations thereof could be adapted for use in a particular case.

Figure 4:
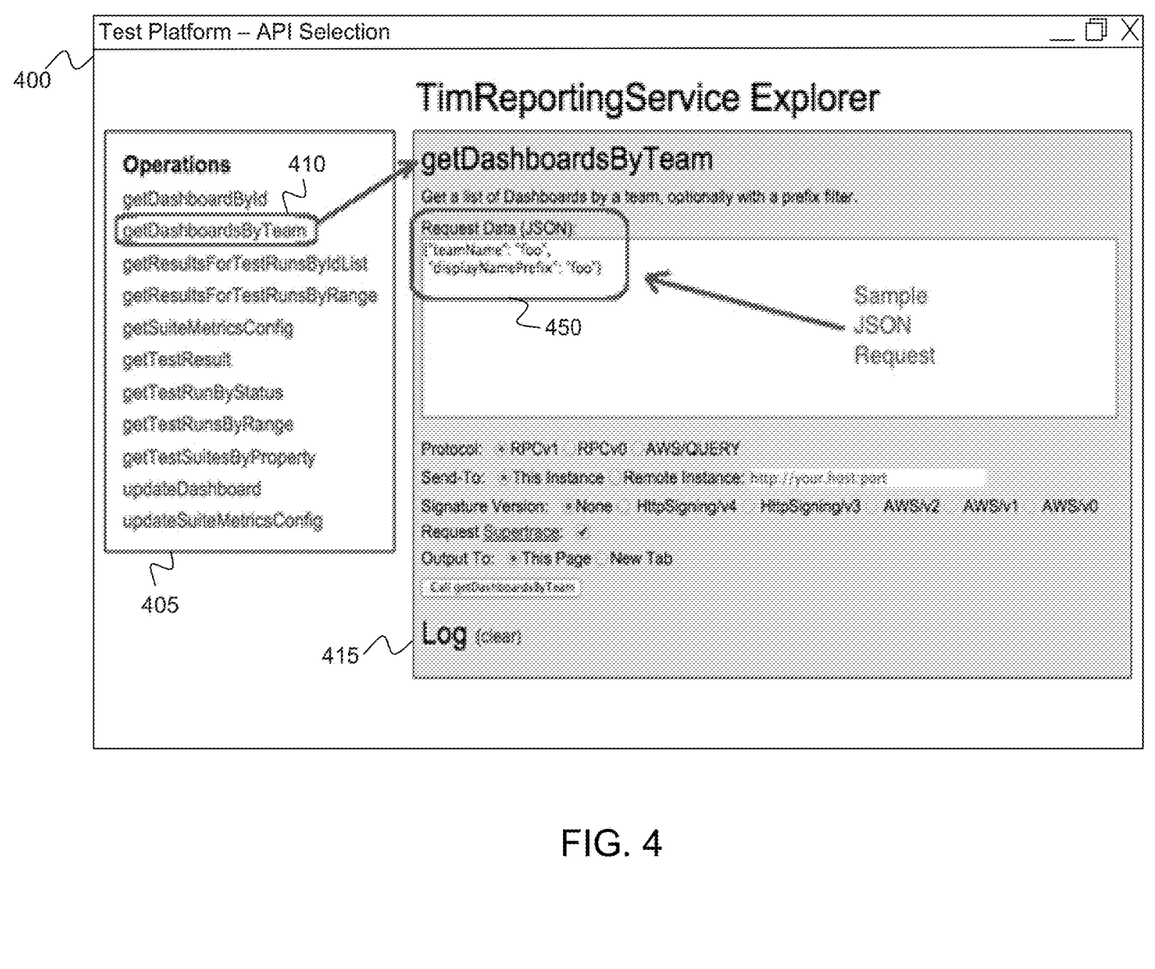
FIG. 4 illustrates an interface identifying synthetic data values to use in testing an API call specified in a web service description language document, according to one embodiment.

FIG. 4 illustrates an example interface 400 presenting synthetic data values to use in testing an API call specified in a service description language document, according to one embodiment. As shown, a panel 405 lists a set of operations identified by parsing a service description language document (e.g., a WSDL document). In this example, an API call 410 named "getDashboardsByTeam" is selected. In response to this selection, the interface 400 renders a panel 415 presenting the details of API Call 410. As shown, in addition to a selected protocol, digital signature versions, and logging information, the panel 415 includes a description of API 415 and lists sample values 450 to use in testing the web service. The sample values include a value "foo" for a "teamName" parameter and the same value—"foo"—for a "displayNmaePrefix" parameter associated with the "getDashboardsByTeam" API call 410. In this example, the values are formatted as Javascript object notation (JSON) elements. The sample values 450 may be used as input values each time the test platform invokes the "getDashboardsByTeam" API call 410.

Figure 5:
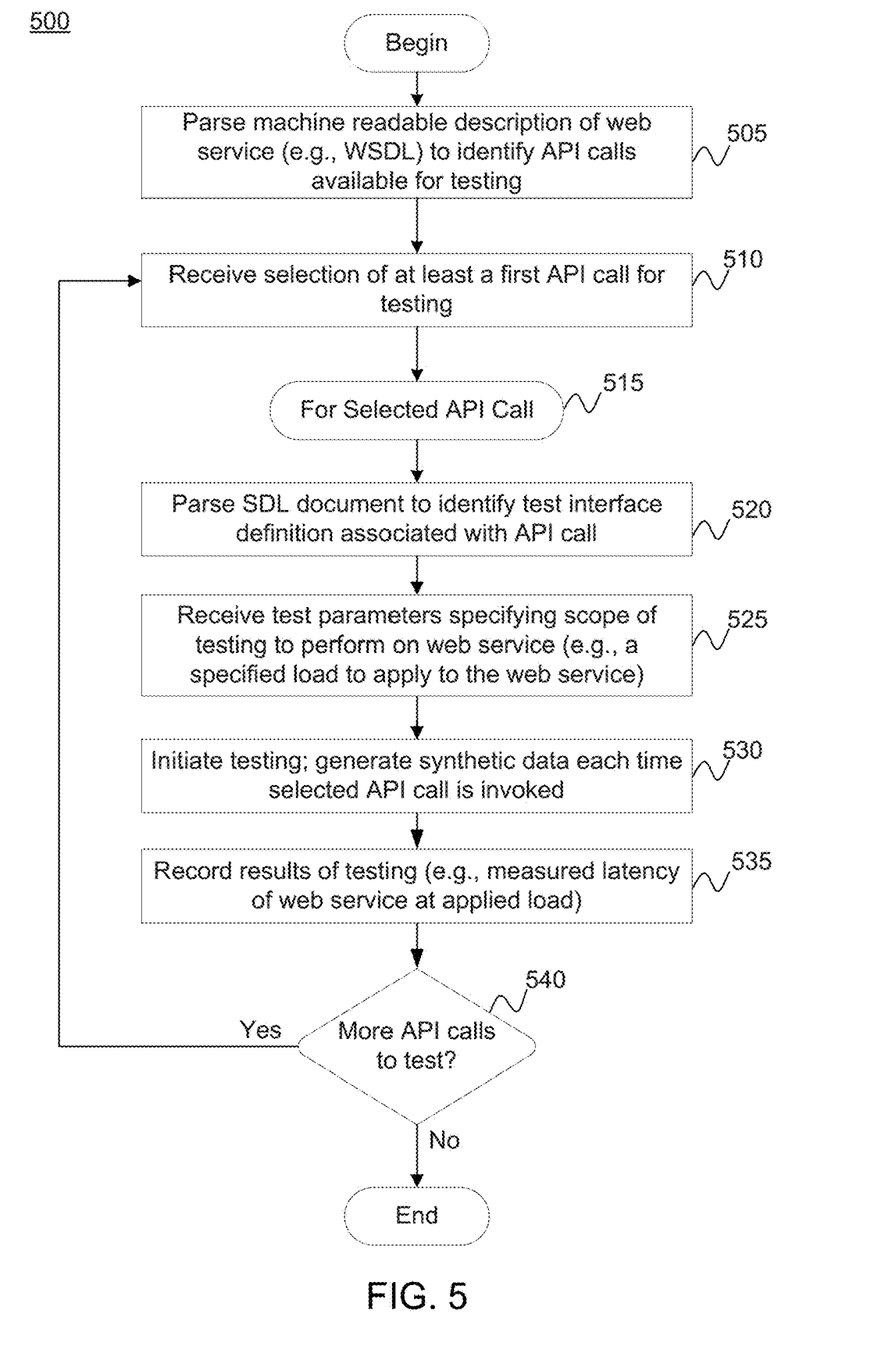
FIG. 5 illustrates a method for testing a web service using synthetic data, according to one embodiment.

FIG. 5 illustrates a method 500 for testing of a web service using synthetic data generated using a service description language document, according to one embodiment. As shown, the method 500 begins at step 505 where a test platform parses a service description language document to identify API calls available for testing. For example, the test platform could parse a WSDL document to identify a set of operations exposed by a given web service, as well as a service endpoint identifying a network address for each operation. In addition, the test platform may parse the WSDL document to determine what input values are needed (or at least supported) by the API calls exposed by the web service. Once identified, the test platform may present a list of API calls available for testing. For example, the interface 400 of FIG. 4 shows a list of API calls shown in panel 405.

At step 510, the test platform receives a selection of at least a first one of the API calls to be tested. Again using the interface 400 of FIG. 4 as an example, a user has selected an API call "getDashboardsByTeam." In other cases, a user could select multiple API calls to subject to testing. For example, assume a first API call generates a response message based on the input parameters passed to the first API call. Further, assume data in the response message is then passed as an input parameter to a second API call, along with other input values. In such a case, the test platform could generate synthetic data to invoke the first API call and then invoke the second API call using data from the response message along with synthetic data generated for the other input parameters of the second API call. In still other cases, multiple API calls could be tested together. For example, two (or more) API calls hosted by a web service could be subjected to load and performance testing in conjunction with one another. In such a case, the test platform could generate synthetic data each time either API call is invoked during testing. Doing so could allow a service provider to correlate the performance of the two API calls of the web service under varying degrees of load.

At step 515, a test phase begins for the API call (or calls) selected for testing at step 510. At step 520, the test platform parses the service description language document to identify a test interface definition. As noted above, the test interface definition may specify sample values and/or a set of rules for generating synthetic data values for the selected API call. For example, the rules could include blueprints or templates for generating input values for each parameter associated with the selected API call. Similarly, fuzzy rules could specify a rule for modifying or "fuzzing" input values included in the test interface definition or generated using a blueprint.

After identifying the rules for generating synthetic data, at step 525, the test platform receives parameters identifying the scope of testing to perform using the API call (or calls) selected at step 510. For example, for load and performance testing, a test engineer may specify a desired amount of load to apply during testing of the web service. The test platform may apply the desired load to the web service by invoking the API call at a rate sufficient to achieve the load specified in the test parameters. In cases where multiple API calls are selected, the test engineer could specify what load to direct to each selected API call or how to map response data from one API call to the input value of another during testing. The test engineer could also specify how to blend the invocation of multiple API during testing. For example, the test engineer could specify a ratio or distribution of how frequently different API calls should be invoked during testing.

In one embodiment, the test engineer may also specify which rules, combinations of rules, or parameters for the rules to use to generate synthetic data at test time. For example, the test engineer could specify to use two different blueprints to generate synthetic data at a specified ratio or specify to use a fuzzy rule to modify a certain percentage of input values (whether specified in the test interface defection or generated using a blueprint). The test engineer could also specify what information to capture as part of testing. For example, for straight load and performance testing, the test platform could measure the latency in receiving responses from a web service API call at different loads. In other cases, the test platform could measure the latency for different API calls exposed at a common endpoint to determine how a given load on a first API call impacts the latency of a second API call. In still other cases, the test platform could measure the latency of multiple interacting API calls to help identify bottlenecks in a workflow that result from different loads. The test platform could also measure how different ratios of fuzzy values impact performance of the service. For example, in cases where the fuzzy rules are used to modify input parameters to create tricky cases that may require exception handling or additional processing, the test platform could measure how different loads of such inputs values degrade the usability of the web service. In addition to latency, the test platform could also measure transactions per second, throughput, a count of concurrent server connections, etc., during testing.

At step 530, the test platform initiates testing of the selected API call (or calls) according to the test parameters. Each time the API is invoked during testing, the test platform uses synthetic data based on the test interface definition to provide input values for the API call. In addition, at step 535, the test platform may capture results needed to measure the performance of the API call under test (e.g., latency measurements at specified loads). At step 540, after completing a given test cycle, the test engineer can continue testing by selecting another API call. Otherwise, the method 500 ends.

Figure 6:
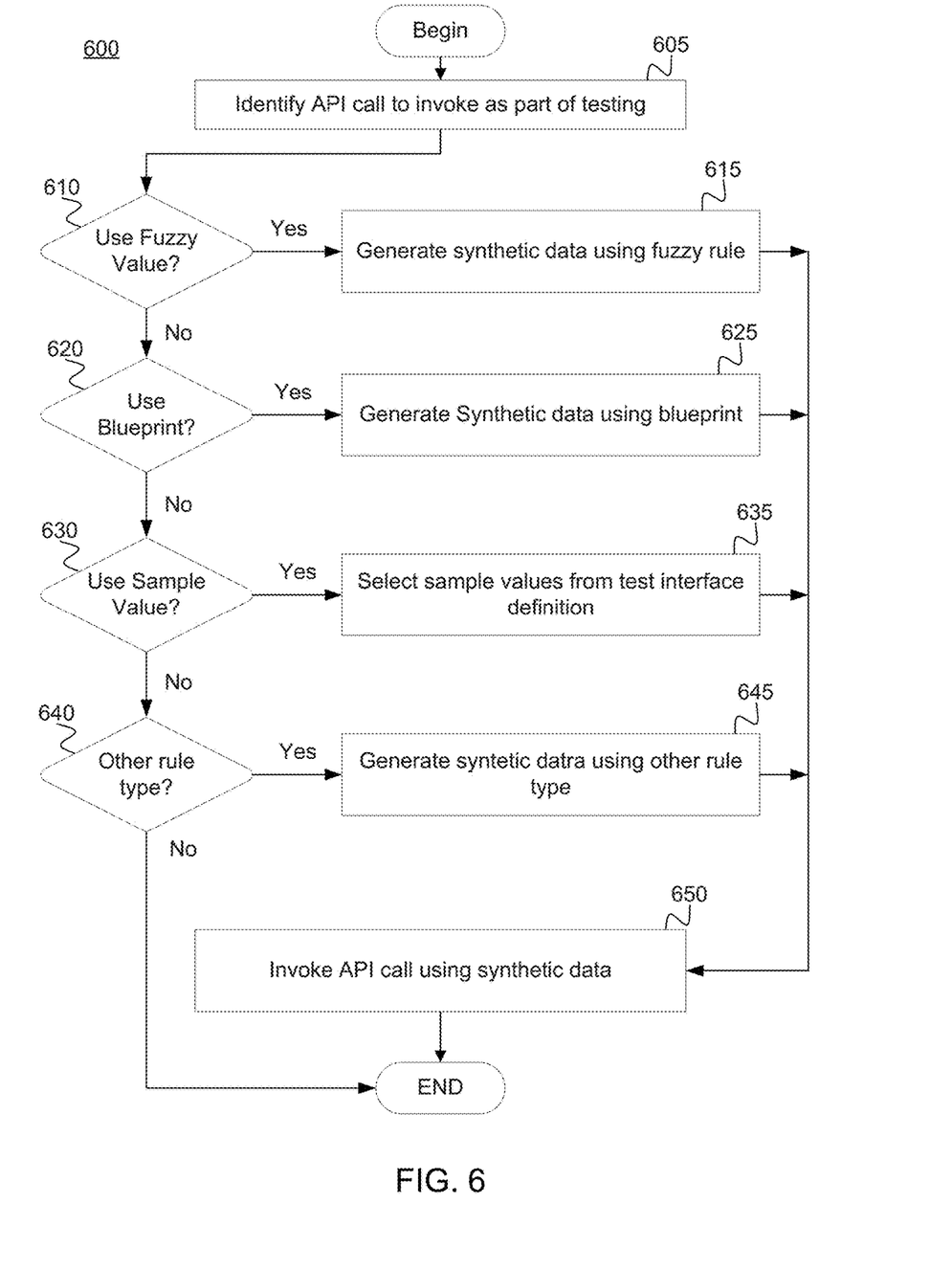
FIG. 6 illustrates a method for generating synthetic data to test a web service based on at least a test interface definition in a service description language document, according to one embodiment.

FIG. 6 illustrates a method 600 for generating synthetic data to test a web service based on a test interface definition in a service description language document describing the web service, according to one embodiment. The method 600 begins once a test platform has initiated testing of a web service, e.g., to perform load and performance testing. The test platform may perform method 600 to generate an input value for each parameter defined for an API call. At step 605, the test platform identifies an API call to invoke as part of testing. For example, the test platform may be configured to invoke the API call to create a specified number of transactions per second or at rate sufficient to achieve a desired load (e.g., by invoking operations exposed by the web service during testing). In one embodiment, the test platform may generate the service request directly. In other cases, a cluster of test platforms or systems managed by the test platform may cooperate to generate a desired load to direct at a web service under test.

Once an API call has been selected (step 605), the test platform generates a message to access or invoke that API call provided by a web service under test. As discussed above, the input values needed to invoke the API call may be generated according to rules specified in the test interface definition in the service description language document. At step 610, if the test interface definition specifies to generate a fuzzy value, then at step 615 the test platform generates a fuzzy input value for a parameter the API call. At step 620, if the test interface definition includes a blueprint for an input value, then at step 625, the test platform generates synthetic data to use as an input value for a parameter based on the blueprint. At step 630, if the test interface definition includes sample values to use as inputs, then at step 635, the test platform selects a sample value from the test interface definition to use as the input value. At step 640, if the test interface definition includes another rule type for generating synthetic data for an input parameter, then an input parameter is generated according to the rule specified in the test interface definition. If no rule (or sample data) is found for a parameter of an API call being invoked, then the method 600 ends, generally resulting in an error condition. Following step 615, 625, 635, or 645 (or after applying a combination of thereof) the test platform invokes the API call using the synthetic test data generated by the test platform (step 650).

Figure 7:
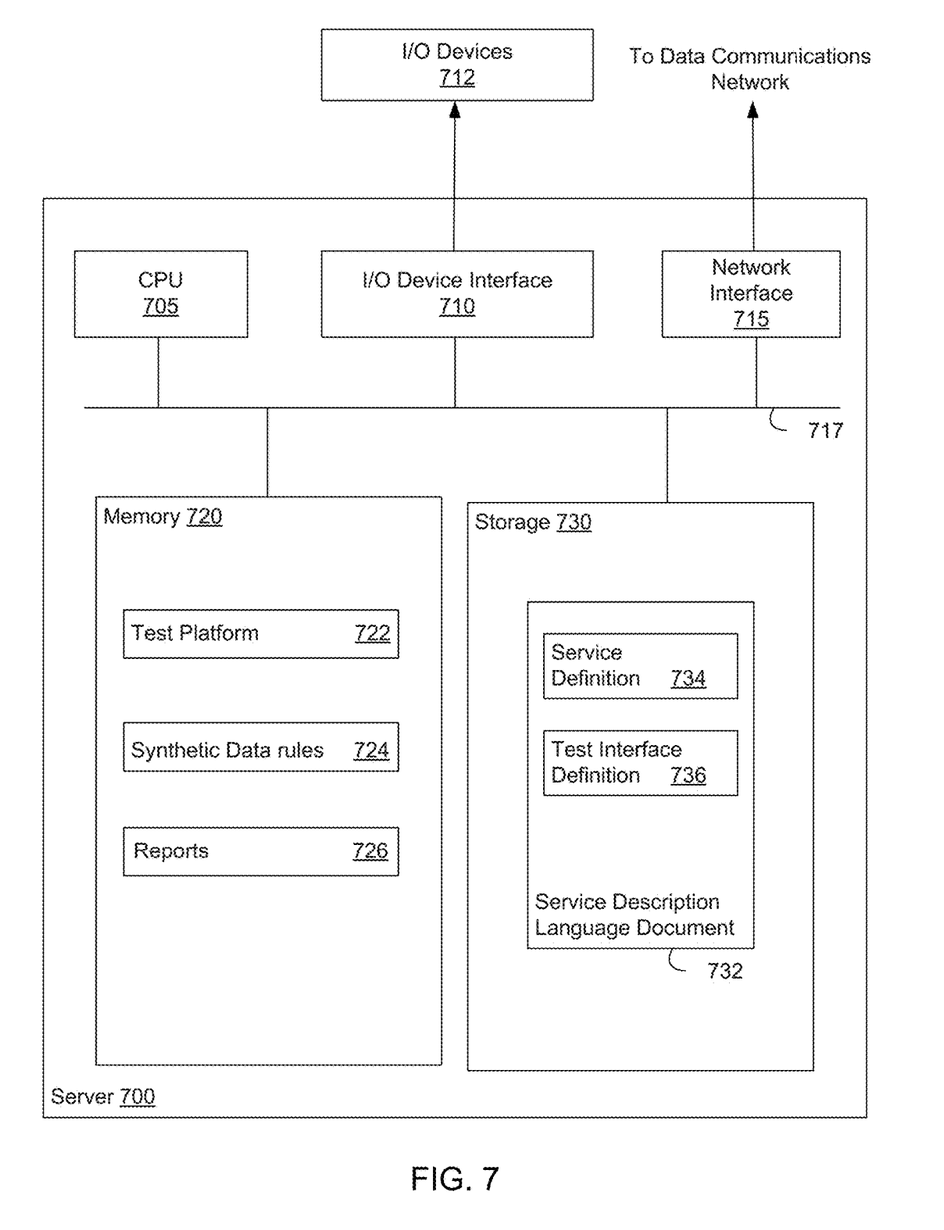
FIG. 7 illustrates an example computing system used to test a web service, according to one embodiment.

FIG. 7 illustrates an example computing system 700 used to test API calls exposed by a web service, according to one embodiment. As shown, the computing system 700 includes, without limitation, a central processing unit (CPU) 705, a network interface 715, a memory 720, and storage 730, each connected to a bus 717. The computing system 700 may also include an I/O device interface 710 connecting I/O devices 712 (e.g., keyboard, display and mouse devices) to the computing system 700. Further, in context of this disclosure, the computing elements shown in computing system 700 may correspond to a physical computing system (e.g., a system in a data center) or may be a virtual computing instance executing within a computing cloud.

The CPU 705 retrieves programming instructions and application data stored in the memory 720 and storage 730. The interconnect 717 is used to transmit programming instructions and application data between the CPU 705, I/O devices interface 710, storage 730, network interface 715, and memory 720. Note, CPU 705 is included to be representative of a single CPU, multiple CPUs, a single CPU having multiple processing cores, and the like, and the memory 720 is generally included to be representative of a random access memory. The storage 730 may be a disk drive or flash storage device. Although shown as a single unit, the storage 730 may be a combination of fixed and/or removable storage devices, such as fixed disc drives, removable memory cards, optical storage, network attached storage (NAS), or a storage area-network (SAN).

Illustratively, the memory 720 includes a test platform 722, synthetic data generation rules 724, and reports 762. And storage 730 includes a service description language document (e.g., a WSDL document) defining a web service to be tested by the test platform 722. As described, test platform may include a parsing component, a synthetic data generator, and a test engine used to test a web service according to a set of test parameters. For example, test parameters may specify to direct an expected production load to a set of one or more API calls exposed by a web service. To do so, the test platform 722 parses a service definition 734 in description language document 732 to identify a set of services that can be tested as well as how to construct messages to invoke an API call at the web service and what parameters are expected for such messages. To generate input values for the parameters, the test platform 722 may parse a test interface definition 736 in description language document 732 to identify synthetic data generation rules 724, e.g., sample values, fuzzy rules, blueprints, etc. Once identified, the test platform 722 can test a web service by invoking API calls using synthetic data generated according to the synthetic data generation rules and store the results of testing in reports 726. For example, reports 726 may record the correctness and latency of responses generated by a web service subjected to varying loads or transaction requests per second during testing.

Advantageously, including a test interface definition in a service description language document, e.g., a WSDL document, allows a test platform to dynamically generate load on demand, as opposed to the classic model of having to build test code which duplicates information from product code and a service description. That is, the test platform described above may use the service description language document and a test interface definition to determine not just which operations or API calls are available for testing, but rules for generating synthetic data to include in messages invoking API calls exposed by the web service. Including the rules for input data from the test code (where they have traditionally been stored) in the service description language document results in a centralized authoritative source for both building the service and testing the service. Doing so reduces the time needed to initiate testing as well as simplifies code maintenance as updates to the web service, reflected in updates to the service description language document, are automatically incorporated by the test platform during testing.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present invention, other and further embodiments of the invention may be devised without departing from the basic scope thereof, and the scope thereof is determined by the claims that follow.

What is claimed is:

1. A computer-readable storage medium storing instructions executable to perform an operation to test a web service defined by a service description language document, the operation comprising:
   parsing the service description language document in order to identify a plurality of operations exposed by the web service, the plurality of operations including first and second operations;
   responsive to receiving a selection of at least the first operation, further parsing the service description language document by operation of one or more computer processors when executing the instructions, and in order to identify one or more parameters defined for the first operation;
   generating a respective input value for each of the one or more parameters, wherein the respective input value is generated based on at least a test interface definition stored independently of the service description language document, the test interface definition specifying at least a first rule for generating input values for the one or more parameters;
   subsequent to receiving a specified amount of load to apply to the first operation, testing the web service by repeatedly invoking the first operation for a determined number of test iterations, including, for each of the one or more parameters, invoking the first operation using the respective input value generated for the respective parameter, wherein the first operation is invoked at a rate determined to result in the specified amount of load; and
   measuring a respective latency of the second operation exposed by the web service, while each of a plurality of different amounts of load, including the specified amount of load, is being applied to the web service via invoking the first operation exposed by the web service, wherein an indication of the measured respective latency of the second operation is output.

2. The computer-readable storage medium of claim 1, wherein the first rule specifies one or more sample values to use as the input value.

3. The computer-readable storage medium of claim 1, wherein the first rule specifies a blueprint for generating the input value.

4. The computer-readable storage medium of claim 1, wherein the service description language document is composed according to a Web Services Description Language (WSDL).

5. The computer-readable storage medium of claim 1, wherein testing the web service further comprises:
   determining the rate at which to invoke the first operation exposed by the web service, based at least in part on the specified amount of load; and
   for each of invocation of the first operation:
      identifying a response from the web service to the invocation of the first operation; and
      evaluating a correctness of the response, based on a corresponding input value for a first parameter generated based on at least the first rule.

6. The computer-readable storage medium of claim 5, wherein based on the output indication for each amount of load, a bottleneck in a workflow and resulting from the different amounts of load is identified, wherein the service description language document is composed according to a Web Services Description Language (WSDL), wherein invoking the first operation comprises:
   generating a message formatted according to the service description language document, the message including the respective input value generated for each of the one or more parameters; and
   transmitting the message to an endpoint identified in the service description language document.

7. The computer-readable storage medium of claim 6, wherein the first rule is of a plurality of rules specified in the test interface definition, the plurality of rules including:
   a sample rule specifying one or more sample values to use as an input value to a parameter;
   a fuzzy rule applied to modify an input value to a parameter; and
   a blueprint rule specifying a blueprint for generating an input value.

8. The computer-readable storage medium of claim 7, wherein the plurality of rules includes a plurality of blueprint rules respectively specifying to:
   generate an input value as a random selection of one or more sample values;
   generate an input value as a random value within a specified range of values;
   generate an input value by selecting one or more sample values in a specified order each time an first operation is invoked in testing the web service;
   generate an input value as a counter incremented each time the first operation is invoked in testing the web service; and
   generate an input value based on at least one specified regular expression.

9. The computer-readable storage medium of claim 8, wherein the specified amount of load comprises a first specified amount of load, wherein the operation further comprises:
   receiving a second specified amount of load to apply to a third operation exposed by the web service;
   parsing the service description language document in order to identify: (i) at least a first parameter associated with the third operation and (ii) a second rule for generating input values for the first parameter associated with the third operation;
   invoking the third operation at a rate which applies the second specified amount of load to the third operation; and
   each time the third operation is invoked, generating an input value for the first parameter associated with the third operation based on at least the second rule;
   wherein the operation is performed by a test server operatively connected to a production server via an enterprise network, wherein the test server comprises a plurality of components including a parsing component, a synthetic data generator, and a test engine.

10. The computer-readable storage medium of claim 9, wherein the parsing component is configured to parse the service description language document, wherein the synthetic data generator is configured to generate the respective input value for each of the one or more parameters, wherein the test engine is configured to test the web service by repeatedly invoking the first operation for the determined number of test iterations;
   wherein the service description language document includes a service implementation definition and a service interface definition, wherein the service implementation definition includes: (i) a service element identifying the web service; (ii) a port element defining a location of the web service; and (iii) a binding element identifying one or more protocols supported by the web service; wherein the service interface definition includes a data-type element, a message element, a port-type element, and an operation element;
   wherein the data-type element specifies a set of data types defined for the web service, wherein the message element describes input values passed to the first operation defined by the web service and further describes return values provided by the web service for the first operation, wherein the port-type element identifies a messaging mode and a network protocol for each operation exposed by the web service, wherein the operation element identifies a set of operations exposed by the web service, the set of operations including the first, second, and third operations.

11. A system to test a web service defined by a service description language document, the system comprising:
   one or more computer processors; and
   a memory containing a program which, when executed on the one or more computer processors, performs an operation comprising:
      parsing the service description language document in order to identify a plurality of functions exposed by the web service, the plurality of functions including first and second functions;
      responsive to receiving a selection of at least the first function, further parsing the service description language document in order to determine one or more parameters needed to invoke the first function exposed;
      generating a respective input value for each of the one or more parameters, wherein the respective input value is generated based on at least based on at least a test interface definition stored independently of the service description language document defining the web service, the test interface definition specifying one or more rules for generating the respective input value for each of the one or more parameters;
      subsequent to receiving a specified amount of load to apply to the first function, testing the web service by, for each of the one or more parameters, invoking the first function using the respective input value generated for the respective parameter, wherein the first function is invoked at a rate determined to result in the specified amount of load; and determining a respective measure of latency for a second function exposed by the web service, while each of a plurality of different measures of load, including the specified amount of load, is being applied via invoking the first function exposed by the web service, wherein an indication of the respective measure of latency for the second function is output.

12. The system of claim 11, wherein invoking the function comprises:
generating a message formatted according to the service description language document which includes the respective input value generated for each of the one or more parameters; and
transmitting the message to an endpoint identified in the service description language document.

13. The system of claim 11, wherein a rule for a first one of the parameters specifies one or more sample values to use as the respective input value.

14. The system of claim 11, wherein a rule for a first one of the parameters specifies a fuzzy rule applied to modify the respective input value.

15. The system of claim 11, wherein a rule for a first one of the parameters specifies a blueprint for generating the respective input value.

16. The system of claim 15, wherein the blueprint specifies to generate the respective input value as one of a random selection of one or more sample values and a random value within a specified range of values.

17. A computer-implemented method to test a web service defined by a service description language document, the computer-implemented method comprising:
parsing the service description language document in order to identify a plurality of application programming interface (API) calls exposed by the web service, the plurality of API calls including first and second API calls;
responsive to receiving a selection of at least the first API call, further parsing the service description language document by operation of one or more computer processors and in order to identify one or more parameters associated with the first API call;
subsequent to receiving a specified amount of load to apply to the first API call, generating a respective input value for each of the one or more parameters, wherein the respective input value is generated based on at least a test interface definition stored independently of the service description language document, the test interface definition specifying at least a first rule for generating input values for the one or more parameters to use in testing the web service;
testing the web service by, for each of the one or more parameters, invoking the first API call using the respective input value generated for the respective parameter, wherein the first API call is invoked at a rate determined to result in the specified amount of load; and
measuring a respective latency of a second API call exposed by the web service, while each of a plurality of different amounts of load, including the specified amount of load, is being applied to the web service via invoking the first API call exposed by the web service, wherein an indication of the measured respective latency of the second API call is output.

18. The computer-implemented method of claim 17, wherein the computer-implemented method further comprises:
parsing the service description language document to identify at least a first parameter associated with a third API call and a second rule for generating input values for the first parameter associated with the third API call;
invoking the third API call at a rate which applies the load to the third API call; and
each time the third API call is invoked, generating an input value for the first parameter associated with the third API call based on at least the second rule.

19. The computer-implemented method of claim 17, wherein invoking the first API call comprises:
generating a message formatted according to the service description language document, wherein the message includes the input value generated for a first parameter; and
transmitting the message to an endpoint identified in the service description language document.

20. The computer-implemented method of claim 17, wherein the first rule specifies one of a sample value to use as the input value, a fuzzy rule applied to modify the input value, and a blueprint for generating the input value.

* * * * *